United States Patent
Yang et al.

(10) Patent No.: US 11,097,264 B2
(45) Date of Patent: Aug. 24, 2021

(54) DESULFATION METHOD FOR SCR CATALYST

(71) Applicant: BASF Corporation, Florham Park, NJ (US)

(72) Inventors: Xiaofan Yang, Highland Park, NJ (US); Weiyong Tang, East Brunswick, NJ (US); Ze Zhang, Shanghai (CN)

(73) Assignee: BASF Corporation, Florham Park, NJ (US)

( * ) Notice: Subject to any disclaimer, the term of this patent is extended or adjusted under 35 U.S.C. 154(b) by 481 days.

(21) Appl. No.: 16/142,451

(22) Filed: Sep. 26, 2018

(65) Prior Publication Data

US 2019/0083967 A1 Mar. 21, 2019

Related U.S. Application Data

(63) Continuation of application No. PCT/IB2017/051774, filed on Mar. 28, 2017.

(51) Int. Cl.
*B01J 38/08* (2006.01)
*B01J 29/90* (2006.01)
(Continued)

(52) U.S. Cl.
CPC .......... *B01J 38/08* (2013.01); *B01D 53/9418* (2013.01); *B01D 53/9477* (2013.01);
(Continued)

(58) Field of Classification Search
CPC ...... B01D 53/96; B01D 2255/50; B01J 37/00; B01J 37/08; B01J 38/00; B01J 38/02; B01J 38/08
See application file for complete search history.

(56) References Cited

U.S. PATENT DOCUMENTS 3,030,181 A   4/1962 Milton
4,043,939 A * 8/1977 Kasaoka ............ B01D 53/8628
                                                              502/38
(Continued)

FOREIGN PATENT DOCUMENTS

CN        1132107 A   10/1996
CN     101772374 A    7/2010
(Continued)

OTHER PUBLICATIONS

International Search Report in counterpart PCT/IB2017/051774, dated Jun. 26, 2017 (3 pages).
(Continued)

*Primary Examiner* — Timothy C Vanoy
(74) *Attorney, Agent, or Firm* — Finnegan, Henderson, Farabow, Garrett & Dunner LLP

(57) ABSTRACT

The present invention provides methods for low temperature desulfating sulfur-poisoned SCR catalysts, and emission control systems adapted to apply such desulfating methods, in order to regenerate catalytic NOx conversion activity. The methods are adapted for treating an SCR catalyst to desorb sulfur from the surface of the SCR catalyst and increase NOx conversion activity of the SCR catalyst, the treating step including treating the SCR catalyst with a gaseous stream comprising a reductant for a first treatment time period and at a first treatment temperature, wherein the first treatment temperature is about 350° C. or less, followed by a second treatment time period and a second treatment temperature higher than the first treatment temperature, wherein the molar ratio of reductant to NOx during the treating step is about 1.05:1 or higher.

27 Claims, 3 Drawing Sheets

(51) Int. Cl.
| | |
|---|---|
| *B01J 29/76* | (2006.01) |
| *B01D 53/94* | (2006.01) |
| *B01D 53/96* | (2006.01) |
| *F01N 3/20* | (2006.01) |
| *F01N 3/28* | (2006.01) |
| *B01J 38/02* | (2006.01) |
| *B01J 29/072* | (2006.01) |
| *B01J 29/72* | (2006.01) |
| *B01J 29/70* | (2006.01) |
| *B01J 29/06* | (2006.01) |
| *B01J 37/02* | (2006.01) |
| *F01N 3/035* | (2006.01) |
| *F01N 3/10* | (2006.01) |

(52) U.S. Cl.
CPC ......... *B01D 53/9495* (2013.01); *B01D 53/96* (2013.01); *B01J 29/06* (2013.01); *B01J 29/072* (2013.01); *B01J 29/70* (2013.01); *B01J 29/72* (2013.01); *B01J 29/763* (2013.01); *B01J 29/90* (2013.01); *B01J 37/0246* (2013.01); *B01J 38/02* (2013.01); *F01N 3/20* (2013.01); *F01N 3/208* (2013.01); *F01N 3/2828* (2013.01); *B01D 2251/2062* (2013.01); *B01D 2255/50* (2013.01); *B01D 2255/904* (2013.01); *B01D 2255/9155* (2013.01); *B01D 2257/302* (2013.01); *B01D 2257/404* (2013.01); *F01N 3/035* (2013.01); *F01N 3/106* (2013.01); *F01N 2330/06* (2013.01); *F01N 2370/04* (2013.01); *F01N 2510/063* (2013.01); *F01N 2610/02* (2013.01); *F01N 2610/146* (2013.01); *F01N 2900/1402* (2013.01)

(56) References Cited

U.S. PATENT DOCUMENTS

| | | | |
|---|---|---|---|
| 4,440,871 A | 4/1984 | Lok et al. | |
| 4,544,538 A | 10/1985 | Zones | |
| 5,525,317 A | 6/1996 | Bhat et al. | |
| 6,162,415 A | 12/2000 | Liu et al. | |
| 7,254,789 B1 | 9/2007 | Fung et al. | |
| 8,356,474 B2 | 1/2013 | Reuter et al. | |
| 10,309,278 B2 * | 6/2019 | Mital | B01D 53/94 |
| 2009/0035200 A1 | 2/2009 | Downs et al. | |
| 2011/0078997 A1 | 4/2011 | Boorse et al. | |
| 2013/0287664 A1 | 10/2013 | Chavannar | |
| 2014/0072508 A1 | 3/2014 | Sauerbeck et al. | |
| 2014/0112853 A1 | 4/2014 | Mohanan et al. | |
| 2014/0237995 A1 | 8/2014 | Yezerets et al. | |
| 2015/0035442 A1 | 2/2015 | Mikani et al. | |
| 2015/0086456 A1 | 3/2015 | Mohanan et al. | |
| 2015/0143798 A1 | 5/2015 | Lee | |
| 2015/0354424 A1 | 12/2015 | Kumar et al. | |
| 2016/0003887 A1 | 1/2016 | Johnson | |
| 2016/0038876 A1 | 2/2016 | Andersen et al. | |
| 2016/0131000 A1 | 5/2016 | Lee et al. | |
| 2016/0194992 A1 | 7/2016 | Shuto et al. | |
| 2019/0101034 A1 * | 4/2019 | Mital | F01N 3/208 |

FOREIGN PATENT DOCUMENTS

| | | | | |
|---|---|---|---|---|
| CN | 102575547 A | | 7/2012 | |
| CN | 105026716 A | | 11/2015 | |
| CN | 105396594 A | | 3/2016 | |
| CN | 105688936 A | * | 6/2016 | ............ B01D 53/96 |
| EP | 2492464 A1 | | 8/2012 | |
| GB | 868846 B1 | | 5/1961 | |
| JP | S 51-071265 A | | 6/1976 | |
| JP | H 11-165043 A | | 6/1999 | |
| JP | 2001-113131 A | | 4/2001 | |
| JP | 2013-506787 A | | 2/2013 | |
| JP | 2016-205351 A | | 12/2016 | |
| KR | 2015-0059535 A | | 6/2015 | |
| WO | WO 2019 233 035 A1 | * | 12/2019 | ............. B01J 23/92 |

OTHER PUBLICATIONS

International Preliminary Report on Patentability in counterpart PCT/IB2017/051774, dated Oct 2, 2018 (9 pages).
Supplemental European Search Report in counterpart EP 17 77 3405, dated Oct. 25, 2019 (2 pages).
European Search Opinion in counterpart EP 17 77 3405, dated Nov. 5, 2019 (3 pages).
Search Report by Registered Search Organization in counterpart Japanese Patent Application No. 2018-551772, dated Jan. 19, 2021 (21 pages).
Notice of Reasons for Refusal in counterpart Japanese Patent Application No. 2018-551772, dated Jan. 26, 2021 (5 pages).
Barrer, R. M. et al; J. Chem. Soc., p. 2892-2903 (1956).
Kumar et al., "Chemical deSOx: An effective way to recover Cu-zeolite SCR catalysts from sulfur poisoning," Catalysis Today, Feb. 13, 2016 (e-pub), vol. 267, pp. 10-16.
Li Zhang et al: "S02 poisoning impact on the NH3-SCR reaction over a commercial Cu-SAPO-34 SCR catalyst", Applied Catalysis B: Environmental, vol. 156-157, Sep. 1, 2014 (Sep. 1, 2014), pp. 371-377.
Office Action Issued by the Chinese National Intellectual Property Administration in the Counterpart Chinese App. No. 201610187747.1 dated Apr. 8, 2021 (11 pages).
Office Action Issued by the Korean Intellectual Property Office in the Counterpart Korean App No. 2018-7030729, dated Apr. 21, 2021 (9 pages).
Brookshear, D. William, et al. "Impact of sulfation and desulfation on NOx reduction using Cu-chabazite SCR catalysts." Catalysis Today 258 (2015): 359-366.
Kumar, Ashok, et al. "Impact of different forms of feed sulfur on small-pore Cu-zeolite SCR catalyst." Catalysis Today 231 (2014): 75-82.

* cited by examiner

DESULFATION METHOD FOR SCR CATALYST

CROSS-REFERENCE TO RELATED APPLICATIONS

This application is a continuation of International App. No. PCT/IB2017/051774; filed Mar. 28, 2017, which International Application was published by the International Bureau in English on Oct. 5, 2017, and claims priority to Chinese Application No. 201610187747, filed Mar. 29, 2016, each of which is incorporated by reference in their entirety and for all purposes.

FIELD OF THE INVENTION

The present invention relates generally to the field of selective catalytic reduction catalysts and desulfation methods used for these catalysts to maintain their catalytic activity towards the selective reduction of nitrogen oxides.

BACKGROUND OF THE INVENTION

Over time, the harmful components of nitrogen oxides (NOx) have led to atmospheric pollution. NOx is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of NOx-containing gas mixtures to decrease atmospheric pollution. One type of treatment involves catalytic reduction of nitrogen oxides. There are two processes: (1) a nonselective reduction process wherein carbon monoxide, hydrogen, or a hydrocarbon is used as a reducing agent; and (2) a selective reduction process wherein ammonia or an ammonia precursor is used as a reducing agent. In the selective reduction process, a high degree of nitrogen oxide removal can be achieved with a stoichiometric amount of reducing agent.

The selective reduction process is referred to as a SCR (Selective Catalytic Reduction) process. The SCR process uses catalytic reduction of nitrogen oxides with a reductant (e.g., ammonia) in the presence of atmospheric oxygen, resulting in the formation predominantly of nitrogen and steam:

$$4NO + 4NH_3 + O_2 \rightarrow 4N_2 + 6H_2O \text{ (standard SCR reaction)}$$

$$2NO_2 + 4NH_3 + O_2 \rightarrow 3N_2 + 6H_2O \text{ (slow SCR reaction)}$$

$$NO + NO_2 + 2NH_3 \rightarrow 2N_2 + 3H_2O \text{ (fast SCR reaction)}$$

Catalysts employed in the SCR process ideally should be able to retain good catalytic activity over a wide range of temperature conditions of use, for example, 200° C. to 600° C. or higher, under hydrothermal conditions. Current catalysts employed in the SCR process include vanadium doped titania and molecular sieves such as zeolites, which have been used in the selective catalytic reduction of nitrogen oxides with a reductant such as ammonia, urea, or a hydrocarbon in the presence of oxygen. These zeolites include metal-promoted zeolite catalysts such as iron-promoted and copper-promoted zeolite catalysts. For example, iron-promoted zeolite beta has been an effective commercial catalyst for the selective reduction of nitrogen oxides with ammonia. Unfortunately, it has been found that under harsh hydrothermal conditions (e.g., as exhibited during the desulfation of an SCR catalyst or the regeneration of a soot filter with temperatures locally exceeding well over 600° C.), the catalytic activity of many metal-promoted zeolites begins to decline. This decline has been attributed to dealumination of the zeolite and the consequent loss of metal-containing active centers within the zeolite.

Desulfation of the SCR catalyst is required when sulfur oxides (SOx), which are produced as combustion byproducts, interfere with the catalytic function of NOx conversion degrading or "poisoning" the catalyst. Despite the introduction of low sulfur diesel fuels, the 15 ppmw (parts per million by weight) concentration of sulfur in these fuels still has the tendency to deactivate current SCR catalysts. It is believed that the sulfur forms complexes with the metal promoter present in the SCR catalyst, such as formation of copper sulfate in copper-promoted catalysts. To restore the SCR catalyst performance, periodical sulfur removal from the SCR catalyst surface (desulfation) at high temperature (>600° C.) is needed to decompose the metal sulfate complexes and recover the SCR catalyst performance to an acceptable level. However, thermal degradation of the SCR catalyst results from this high temperature desulfation treatment.

Many diesel vehicles have difficulty in attaining these high desulfation temperatures and as a consequence there remains a great need in the art for new desulfation method development to lower the desulfation temperature and to maintain long term SCR catalyst performance.

SUMMARY OF THE INVENTION

The present invention provides methods for desulfating at low temperature sulfur-poisoned SCR catalyst compositions in order to regenerate the catalytic NOx conversion activity of these catalysts. The methods include exposing the SCR catalyst composition to a reductant for a time and temperature sufficient for desorption of the sulfur species from the catalyst composition. Unlike current desulfation methods, which utilize high temperatures (>600° C.) to remove the sulfur the desulfation methods described herein desorb sulfur at lower temperatures (<600° C.), in the presence of a reductant. The reductant can be ammonia or any precursor thereof.

The SCR catalyst composition described in the invention is suitable for at least partial conversion of gaseous NOx emissions and includes at least one metal ion-exchanged on a porous refractory oxide support, such as a molecular sieve, that provides an effect on NOx conversion activity. When the metal ion-exchanged molecular sieve is exposed to the sulfur present in the exhaust gas stream, the gaseous sulfur oxides (SOx) will combine with the metal ion-exchanged on the molecular sieve and form a metal sulfate species. Often removal of the sulfate species requires high energy, e.g., heat, due to the strong bond energy between the metal and the sulfate ion. The formation of these metal sulfate species result in a decline of free metal ions available for NOx conversion. As a result catalytic NOx conversion activity decreases under standard SCR conditions. Introduction of an ammonia based reductant at low temperature to a poisoned SCR catalyst composition promotes ion exchange of the metal sulfate species within the molecular sieve with the ammonia or precursor thereof to from an ammonium sulfate species, which can at temperature lower than 600° C. dissociate from the catalyst and free the metal in the molecular sieve to regain its catalytic activity for NOx conversion.

In one aspect of the invention, a method for desulfating, i.e., removing sulfur from, a metal-promoted molecular sieve catalyst having an amount of sulfur thereon is described, comprising treating the metal-promoted molecular sieve catalyst with a gaseous stream comprising an excess of reductant for a first treatment time and at a first treatment temperature followed by a temperature increase to a second temperature for a second time sufficient to decompose the ammonium sulfate and desorb sulfur from the surface of the metal-promoted molecular sieve catalyst. This desulfation process increases NOx conversion activity of the metal-promoted molecular sieve catalyst, wherein the first treatment temperature is on average less than the second treatment temperature and wherein the molar ratio of gaseous reductant to NOx during the treating step is at least about 1.05:1. In some embodiments, the first treatment temperature is less than about 350° C. for at least a portion of the treatment time. In some embodiments, the portion of the first treatment time ranges from about 10% to about 100% of the first treatment time. In some embodiments, the metal-promoted molecular sieve catalyst comprises a small pore, 8-ring molecular sieve with a double six ring structure type selected from AEI, AFT, AFX, CHA, EAB, ERI, KFI, LEV, LTN, MSO, SAS, SAT, SAV, SFW, and TSC. In other embodiments, the metal-promoted molecular sieve catalyst comprises a molecular sieve with a CHA crystal structure. In another embodiment, the CHA crystal structure is selected from a group consisting of SSZ-13, SSZ-62, natural chabazite, zeolite K-G, Linde D, Linde R, LZ-218, LZ-235, LZ-236, ZK-14, SAPO-34, SAPO-4, SAPO-47, and ZYT-6. In a specific embodiment, the CHA crystal structure is an aluminosilicate zeolite. In a further embodiment, the catalyst comprises a copper-promoted molecular sieve or an iron-promoted molecular sieve. In another embodiment, the metal-promoted molecular sieve catalyst comprises a molecular sieve containing a promoter metal in an amount of from about 0.01% to about 15.0% by weight, based on the total weight of the molecular sieve, calculated as metal oxide. In one embodiment, the metal-promoted molecular sieve catalyst comprises a metal-promoted molecular sieve containing copper or iron, which is present in the metal-promoted molecular sieve in an amount of from about 0.01% to about 10.0% by weight of said molecular sieve, based on the total weight of the molecular sieve, calculated as copper oxide (CuO) or iron oxide ($Fe_2O_3$). In another embodiment, the metal-promoted molecular sieve catalyst is an SCR catalyst. In another embodiment, the reductant comprises ammonia or an ammonia precursor. In one embodiment, the sulfur desorbed from the surface of the metal-promoted molecular sieve catalyst is released as gaseous $SO_2$. In one embodiment, the treatment time is at least 1 minute. In another embodiment, the treatment temperature is less than about 300° C. for at least a portion of the treatment time. In a specific embodiment, the treatment temperature remains in the range of about 200° C. to about 600° C. during the treating step. In a further embodiment, deNOx efficiency of the metal-promoted molecular sieve catalyst following the treating step is at least 70% when exposed to a feed gas mixture of 300 ppm of NO, 300 ppm of $NH_3$, 10% by vol. $O_2$, 5% by vol. $H_2O$, balance $N_2$ at an inlet temperature of 220° C. with a space velocity of 60,000 per hour. In another embodiment, the treating step removes at least 50% by wt. of the sulfur adsorbed on the metal-promoted molecular sieve catalyst. In another embodiment, the treating step comprises a first treatment time period during which the metal-promoted molecular sieve catalyst is exposed to the gaseous stream comprising the reductant at a temperature of no greater than about 350° C. and a second treatment time period wherein the treatment temperature is increased to a maximum temperature in the range of about 400° C. to about 600° C. In another embodiment, the first treatment time period is about 10% to about 20% of the treatment time. In another embodiment, the first treatment time period is about 15 to about 45 seconds and the second treatment time period is about 1 to about 3 minutes. In another embodiment, the sulfur desorbed from the surface of the metal-promoted molecular sieve catalyst is released as gaseous $SO_2$. In another embodiment, the treatment time is at least 1 minute. In another embodiment, the treating step removes at least 50% by wt. of the sulfur adsorbed on the metal-promoted molecular sieve catalyst.

Another aspect of the invention describes a method of desulfating a metal-promoted molecular sieve catalyst, comprising:

injecting a gaseous reductant into an exhaust gas from an engine;

exposing the metal-promoted molecular sieve catalyst to the exhaust gas, wherein the exhaust gas comprises one or more sulfur-containing gaseous species; and at periodic intervals, desulfating the metal-promoted molecular sieve catalyst by treating the metal-promoted molecular sieve catalyst with a gaseous stream comprising the reductant in a two-step process with a first treatment time at a first treatment temperature followed by heating the catalyst to a second treatment temperature for a second treatment time sufficient to desorb sulfur from the surface of the metal-promoted molecular sieve catalyst composition and increase NOx conversion activity of the metal-promoted molecular sieve catalyst, wherein the treatment temperature is less than about 350° C. for at least a portion of the treatment time and wherein the molar ratio of gaseous reductant to NOx during the treating step is at least about 1.05:1.

In some embodiment, the treating step comprises a first treatment time period during which the metal-promoted molecular sieve catalyst is exposed to the gaseous stream comprising the reductant at a temperature of no greater than about 350° C. and a second treatment time period wherein the treatment temperature is increased to a maximum temperature in the range of about 400° C. to about 600° C. In another embodiment, the first treatment time period is about 10% to about 20% of the treatment time. In another embodiment, the first treatment time period is about 15 to about 45 seconds and the second treatment time period is about 1 to about 3 minutes. In another embodiment, the periodic intervals for the desulfating step are determined by at least one of: (a) preselecting mileage intervals for desulfation; (b) measuring the NOx level downstream from the metal-promoted molecular sieve catalyst and comparing the NOx level to a predetermined threshold value, which if exceeded, triggers the desulfating step; and (c) measuring the SOx level upstream or downstream from the metal-promoted molecular sieve catalyst and comparing the SOx level to a predetermined threshold value, which if exceeded, triggers the desulfating step. In another embodiment, the reductant comprises ammonia or an ammonia precursor. In another embodiment, the treating step removes at least 50% by wt. of the sulfur adsorbed onto the metal-promoted molecular sieve catalyst. In another embodiment, the treatment time is at least 1 minute. In another embodiment the two step treatment process can be repeated multiple times to improve efficiency of the desulfation process. In another embodiment, the treatment temperature remains in the range of about 200° C. to about 600° C. during the treating step. In another embodiment, the metal-promoted molecular sieve catalyst is an SCR catalyst.

Another aspect of the invention describes an emission treatment system for treatment of an exhaust gas stream comprising:

a. an engine producing an exhaust gas stream;
b. an SCR catalyst positioned downstream from the engine in fluid communication with the exhaust gas stream and adapted for the reduction of NOx within the exhaust stream to form a treated exhaust gas stream;
c. an injector upstream of the SCR catalyst and adapted for the addition of a reductant to the exhaust gas stream to promote reduction of NOx to $N_2$ and water as the exhaust gas stream is exposed to the SCR catalyst; and
d. a controller operatively connected to the engine and the injector and configured to apply a desulfation treatment process to the SCR catalyst, the desulfation treatment process comprising treating the SCR catalyst with a gaseous stream comprising a reductant for a first treatment time and at a first treatment temperature sufficient to transform copper sulfate into ammonium sulfate followed by heating the catalyst for a second treatment time to a second treatment temperature sufficient to desorb sulfur from the surface of the SCR catalyst composition and increase NOx conversion activity of the SCR catalyst, wherein the first treatment temperature is less than about 350° C. for the first treatment time, wherein the molar ratio of gaseous reductant to NOx during the treating step is at least about 1.05:1, and wherein during a heating event the exhaust gas temperature is increased to a second temperature in the range of about 400° C. to about 600° C. for the second treatment time sufficient to decompose ammonium sulfate, liberate sulfur from the catalyst, and recover activity for the SCR reaction.

In some embodiments, the exhaust gas temperature is increased quickly in step e.

In some embodiments, the SCR catalyst comprises a metal promoted molecular sieve. In other embodiment, the system further comprises a NOx sensor located upstream or downstream of the SCR catalyst adapted for measuring NOx gases in the exhaust gas stream and wherein the sensor communicates with the controller. In another embodiment, a SOx sensor is located downstream of the SCR catalyst adapted for measuring SOx gases in the exhaust gas stream and wherein the sensor communicates with the controller. In a specific embodiment, the engine is a diesel engine. In another embodiment, the system further comprises a diesel oxidation catalyst and/or a catalyzed soot filter upstream or downstream of the metal-promoted molecular sieve catalyst. In some embodiments, the reductant comprises ammonia or an ammonia precursor.

The invention includes, without limitation, the following embodiments.

Embodiment 1: A method for desulfating a SCR catalyst having sulfur thereon, comprising treating the SCR catalyst to desorb sulfur from the surface of the SCR catalyst and increase NOx conversion activity of the SCR catalyst, the treating step comprising treating the SCR catalyst with a gaseous stream comprising a reductant for a first treatment time period and at a first treatment temperature, wherein the first treatment temperature is about 350° C. or less, followed by a second treatment time period and a second treatment temperature higher than the first treatment temperature, wherein the molar ratio of reductant to NOx during the treating step is about 1.05:1 or higher.

Embodiment 2: The method of any preceding or subsequent embodiment, wherein the first treatment temperature is about 300° C. or less.

Embodiment 3: The method of any preceding or subsequent embodiment, wherein the first treatment temperature is about 250° C. or less.

Embodiment 4: The method of any preceding or subsequent embodiment, wherein the second treatment temperature is in the range of about 400° C. to about 600° C.

Embodiment 5: The method of any preceding or subsequent embodiment, wherein the second treatment temperature is in the range of about 400° C. to about 450° C.

Embodiment 6: The method of any preceding or subsequent embodiment, wherein both the first treatment temperature and the second treatment temperature are in the range of about 200° C. to about 600° C.

Embodiment 7: The method of any preceding or subsequent embodiment, wherein both the first treatment temperature and the second treatment temperature are in the range of about 250° C. to about 425° C.

Embodiment 8: The method of any preceding or subsequent embodiment, wherein the first treatment time period is about 10% to about 50% of the total of the first and second treatment time periods.

Embodiment 9: The method of any preceding or subsequent embodiment, wherein the first treatment time period is about 10% to about 20% of the total of the first and second treatment time periods.

Embodiment 10: The method of any preceding or subsequent embodiment, wherein the first treatment time period is about 15 to about 45 seconds and the second treatment time period is about 1 to about 3 minutes.

Embodiment 11: The method of any preceding or subsequent embodiment, wherein the molar ratio of reductant to NOx during the treating step is about 2:1 or higher.

Embodiment 12: The method of any preceding or subsequent embodiment, further comprising injecting a gaseous reductant into an exhaust gas from an engine; exposing the SCR catalyst to the exhaust gas, wherein the exhaust gas comprises one or more sulfur-containing gaseous species; and at periodic intervals, desulfating the SCR catalyst by said treating step.

Embodiment 13: The method of any preceding or subsequent embodiment, wherein the periodic intervals for the desulfating treatment are determined by at least one of: (a) preselecting mileage intervals for desulfation; (b) measuring the NOx level downstream from the SCR catalyst and comparing the NOx level to a predetermined threshold value, which if exceeded, triggers the desulfating step; and (c) measuring the SOx level downstream from the SCR catalyst and comparing the SOx level to a predetermined threshold value, which if exceeded, triggers the desulfating step.

Embodiment 14: The method of any preceding or subsequent embodiment, wherein the SCR catalyst comprises a small pore, 8-ring molecular sieve with a double six ring structure type selected from AEI, AFT, AFX, CHA, EAB, ERI, KFI, LEV, LTN, MSO, SAS, SAT, SAV, SFW, and TSC.

Embodiment 15: The method of any preceding or subsequent embodiment, wherein the SCR catalyst comprises an aluminosilicate zeolite with a CHA crystal structure.

Embodiment 16: The method of any preceding or subsequent embodiment, wherein the SCR catalyst comprises a molecular sieve containing a promoter metal in an amount of from about 0.01% to about 15.0% by weight, based on the total weight of the molecular sieve, calculated as metal oxide.

Embodiment 17: The method of any preceding or subsequent embodiment, wherein the promoter metal is iron or copper.

Embodiment 18: The method of any preceding or subsequent embodiment, wherein the reductant comprises ammonia or an ammonia precursor.

Embodiment 19: The method of any preceding or subsequent embodiment, wherein the sulfur desorbed from the surface of the SCR catalyst is released as gaseous $SO_2$.

Embodiment 20: The method of any preceding or subsequent embodiment, wherein deNOx efficiency of the SCR catalyst following the treating step is at least 70% when exposed to a feed gas mixture of 300 ppm of NO, 300 ppm of $NH_3$, 10% by vol. $O_2$, 5% by vol. $H_2O$, balance $N_2$ at an inlet temperature of 220° C. with a space velocity of 60,000 per hour.

Embodiment 20: The method of any preceding or subsequent embodiment, wherein the treating step removes at least 50% by weight of the sulfur adsorbed on the SCR catalyst.

Embodiment 21: An emission treatment system for treatment of an exhaust gas stream, the emission treatment system comprising:
  a. an engine producing an exhaust gas stream;
  b. an SCR catalyst positioned downstream from the engine in fluid communication with the exhaust gas stream and adapted for the reduction of NOx within the exhaust stream to form a treated exhaust gas stream;
  c. an injector upstream of the SCR catalyst and adapted for the addition of a reductant to the exhaust gas stream to promote reduction of NOx to $N_2$ and water as the exhaust gas stream is exposed to the SCR catalyst; and
  d. a controller operatively connected to the engine and the injector and configured to apply a desulfation treatment process to the SCR catalyst at periodic intervals, the desulfation treatment process comprising treating the SCR catalyst with a gaseous stream comprising a reductant for a first treatment time period and at a first treatment temperature, wherein the first treatment temperature is about 350° C. or less, followed by a second treatment time period and a second treatment temperature higher than the first treatment temperature, wherein the molar ratio of reductant to NOx during the treating step is about 1.05:1 or higher.

Embodiment 22: The emission treatment system of any preceding or subsequent embodiment, wherein the SCR catalyst comprises a molecular sieve containing a promoter metal in an amount of from about 0.01% to about 15.0% by weight, based on the total weight of the molecular sieve, calculated as metal oxide.

Embodiment 23: The emission treatment system of any preceding or subsequent embodiment, further comprising one or both of (1) a NOx sensor located downstream of the SCR catalyst adapted for measuring NOx gases in the exhaust gas stream and wherein the NOx sensor communicates with the controller; and (2) a SOx sensor located downstream of the SCR catalyst adapted for measuring SOx gases in the exhaust gas stream and wherein the SOx sensor communicates with the controller.

Embodiment 24: The emission treatment system of any preceding or subsequent embodiment, wherein the engine is a diesel engine.

Embodiment 25: The emission treatment system of any preceding or subsequent embodiment, further comprising a diesel oxidation catalyst or a catalyzed soot filter upstream of the SCR catalyst.

Embodiment 27: The emission treatment system of any preceding or subsequent embodiment, wherein the reductant comprises ammonia or an ammonia precursor.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 1:
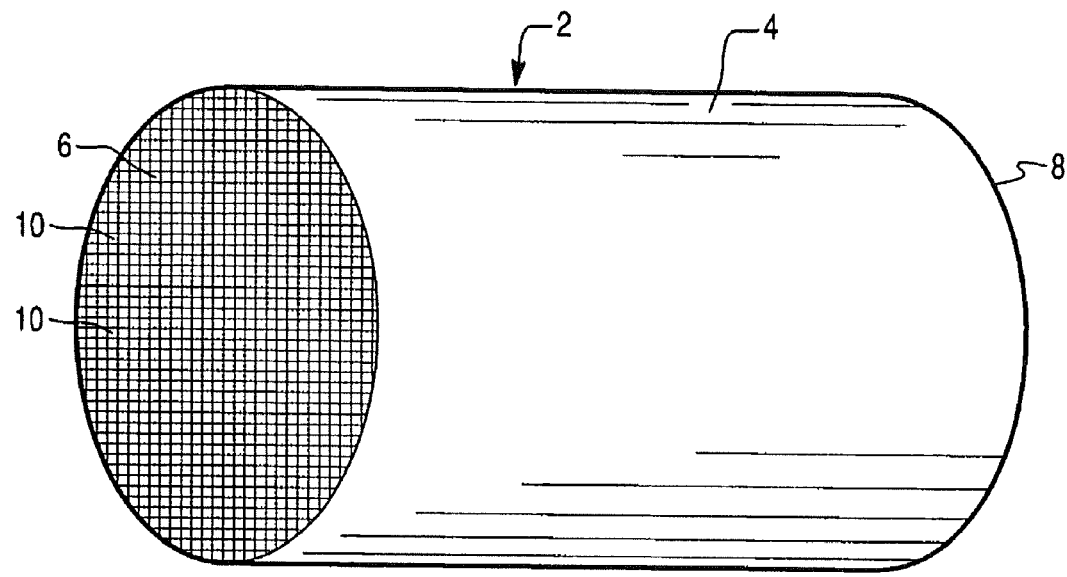
FIG. 1 is a perspective view of a honeycomb-type substrate carrier which may comprise a catalytic article (i.e., selective catalytic reduction catalyst (SCR)) washcoat composition in accordance with the present invention.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present invention provides methods for desulfating at low temperature sulfur-poisoned SCR catalyst compositions in order to regenerate the catalytic NOx conversion activity of these catalysts. The methods include exposing the SCR catalyst composition to a reductant for a first time and a first temperature followed by heating the catalyst to a second temperature for a second time sufficient for desorption of the sulfur species from the surface of the catalyst composition. The sulfur species adsorbed onto the catalyst can exist as elemental sulfur or can be present in an oxidation state of −II, +II, +IV, +VI, or a combination thereof depending on the counter ion sulfur associates with. Likewise, the sulfur species desorbed from the catalyst can also exist as elemental sulfur or can be present in an oxidation state of +II, +IV, +VI, or a combination thereof depending on counter ion sulfur associates with. Unlike current desulfation methods, which utilize high temperatures (i.e., over 600° C.) to remove the sulfur, the desulfation methods described herein desorb sulfur at much lower temperatures in the presence of a reductant. The reductant can be ammonia or any precursor thereof.

The SCR catalyst composition described in the invention is suitable for at least partial conversion of gaseous NOx emissions and includes at least one metal ion-exchanged on a porous refractory oxide support, such as a molecular sieve (a metal ion-exchanged CHA zeolite), that provides an effect on NOx conversion activity. During the exposure of the metal ion-exchanged CHA zeolite to sulfur present in the exhaust gas stream, the sulfur will combine with the metal ion-exchanged in the molecular sieve and from a metal sulfate species. Often removal of the sulfate species requires high energy, e.g., heat, due to the strong bond energy between the metal and the sulfate ion. The formation of these metal sulfate species results in a decline of free metal ions available to catalyze NOx conversion. As a result catalytic NOx conversion activity decreases. Introduction of an ammonia based reductant at a first low temperature to a poisoned SCR catalyst composition promotes ion exchange of the metal sulfate species within the molecular sieve with the ammonia or precursor thereof to from an ammonium sulfate species, which can dissociate from the catalyst and at a second temperature free the metal in the molecular sieve to regain its catalytic activity for NOx conversion.

The SCR catalyst composition can be prepared using metal ion-exchange processes or incipient wetness impregnation techniques, or solid-state diffusion methods and coated onto a catalyst substrate using a washcoat technique as set forth more fully below.

Ion exchange is a process commonly used for exchanging ions residing at cation exchange sites in the zeolite that can be exchanged with a different cation. This is accomplished by preparing a slurry of the porous support, i.e., zeolite, in a solution containing the outside metal cation of interest to be exchanged. Heat may be optionally applied during this process. The outside metal ion can now diffuse into the pores of the support and exchange with the residing ion, i.e., sodium (Na+), ammonium ($NH_4^+$), or proton ($H^+$) cations to form the metal-ion zeolite.

However unlike the ion exchange process, incipient wetness impregnation techniques, also called capillary impregnation or dry impregnation, commonly used for the synthesis of heterogeneous materials, i.e., catalysts, do not require a lengthy ion-exchange procedure. Typically, a metal precursor is dissolved in an aqueous or organic solution and then the metal-containing solution is added to a catalyst support, i.e., zeolite, containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to drive off the volatile components within the solution, depositing the metal on the catalyst surface and if the drying and calcination is performed correctly, the metal cations can potentially reside at exchange sites within the zeolite. The maximum loading is limited by the solubility of the precursor in the solution. The concentration profile of the impregnated material depends on the mass transfer conditions within the pores during impregnation and drying.

An alternative method for creating a transition metal exchanged zeolite is to combine the ammonium or proton form of the zeolite in an intimate mixture with a metal oxide. Then upon heating the metal can move via a solid-state diffusion process into the cation exchange sites of the zeolite.

The following terms shall have, for the purposes of this application, the respective meanings set forth below.

As used herein, the term "selective catalytic reduction" (SCR) refers to the catalytic process of reducing oxides of nitrogen (NOx) to dinitrogen ($N_2$) using a nitrogenous reductant (e.g., ammonia, urea, and the like).

As used herein, the term "catalyst" or "catalyst composition" refers to a material that promotes a reaction. As used herein, the phrase "catalyst system" refers to a combination of two or more catalysts, for example a combination of a first SCR catalyst and a second SCR catalyst. The catalyst system may be in the form of a washcoat in which the two SCR catalysts are mixed together. The catalyst may be "degreened" meaning that the catalyst was exposed to high temperature for a certain short amount of time.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used therein, the term "desulfation" broadly refers to the process of reversing the process of sulfation meaning removing sulfur containing species from a catalyst such as a molecular sieve. Often this removal requires high energy and is accomplished under harsh thermal conditions. Here, the surface sulfur species includes sulfur ($S^{2-}$), elemental sulfur)($S^0$), sulfite ($SO_3^{-2}$), and sulfate ($SO_4^{2-}$); and the sulfur removed from the catalyst is in the form of sulfur dioxide ($SO_2$), sulfur trioxide ($SO_3$), or sulfuric acid ($H_2SO_4$).

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may also contain entrained non-gaseous components such as liquid droplets, solid particulates, and the like. The exhaust gas stream of a lean burn engine typically further comprises combustion products, products of incomplete combustion, oxides of nitrogen (NOx), combustible and/or carbonaceous particulate matter (PM) also known as (soot), and un-reacted oxygen and nitrogen.

As used herein, the term "substrate" refers to the monolithic material onto which the catalyst composition is placed, typically in the form of a washcoat containing a plurality of particles containing a catalytic composition thereon. A washcoat is formed by preparing a slurry containing a certain solid content (e.g., 10-60% by weight) of particles in a liquid vehicle, which is then coated onto a substrate and dried to provide a washcoat layer. This process is called a washcoat process, wherein the substrate is coated with the slurry to form a catalytic coating onto the substrate.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

As used herein, the term "catalytic article" refers to an element that is used to promote a desired reaction. For example, a catalytic article may comprise a washcoat containing catalytic compositions on a substrate. The catalytic article may be "degreened" meaning that the catalyst was exposed to high temperature for a short certain amount of time. The catalyst article may also be "aged" meaning that the catalyst was exposed to high temperature for a longer certain amount of time representative of "full useful life".

The term "abate" means to decrease in amount and "abatement" means a decrease in the amount, caused by any means.

As used herein, "impregnated" or "impregnation" refers to permeation of the soluble catalytic material into the porous structure of the support material.

SCR Catalyst Composition (Catalytic Article)

a. Catalyst Composition

The catalyst composition includes a metal ion-exchanged molecular sieve containing at least one metal. The concentration of metal present in the metal ion-exchanged molecular sieve can vary, but will typically be from about 0.1 wt. % to about 15 wt. % relative to the weight of the ion-exchanged molecular sieve, calculated as metal oxide. Likewise, the concentration of any optionally additional metal present in the metal ion-exchanged molecular sieve can also vary, but will typically be from about 0.1 wt. % to about 15 wt. % relative to the weight of the ion-exchanged molecular sieve, calculated as the metal oxide. In some embodiments, copper is selected as the metal and is present in the copper ion-exchanged molecular sieve at a concentration from about 0.1 wt. % to about 10 wt. % relative to the weight of the ion-exchanged molecular sieve, calculated as copper oxide. In some embodiments, iron is selected as the metal and is present in the iron ion-exchanged molecular sieve at a concentration from about 0.1 wt. % to about 10 wt. % relative to the weight of the ion-exchanged molecular sieve, calculated as iron oxide. In further embodiments, the molecular sieve is a chabazite (CHA) zeolite support.

The metal is intentionally added to the molecular sieves to enhance the catalytic activity compared to molecular sieves that do not have a metal intentionally added. These metals are often referred to as "promoter metals" and are added to the molecular sieve using ion-exchange processes or incipient wetness processes. Therefore, these ion-exchanged molecular sieves are often referred to as 'metal-promoted" molecular sieves. In order to promote the SCR of oxides of nitrogen, in one or more embodiments, a suitable metal is exchanged into the molecular sieve component.

Accordingly, the molecular sieve of one or more embodiments may be subsequently ion-exchanged with one or more metals selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides and a combination thereof. In further embodiments, the molecular sieve of one or more embodiments may be subsequently ion-exchanged with one or more promoter metals such as copper (Cu), cobalt (Co), nickel (Ni), lanthanum (La), manganese (Mn), iron (Fe), vanadium (V), silver (Ag), and cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), and tungsten (W). In specific embodiments, the molecular sieve component is promoted with Cu or Fe.

As mentioned previously, the promoter metal content of the metal ion-exchanged molecular sieve component, calculated as the oxide, is, in one or more embodiments, at least about 0.1 wt. %, reported on a volatile-free basis. In one or more embodiments, the promoter metal is present in an amount in the range of about 0.1% to about 10% by weight, based on the total weight of the ion-exchanged molecular sieve. In one or more specific embodiments, the promoter metal comprises Cu, and the Cu content, calculated as CuO is in the range of up to about 10 wt. %, including 9, 8, 7, 6, 5, 4, 3, 2, 1, 0.5, and 0.1 wt. %, on an oxide basis, in each case based on the total weight of the calcined ion-exchanged molecular sieve component and reported on a volatile free basis.

In one or more specific embodiments, the promoter metal comprises Fe, and the Fe content, calculated as $Fe_2O_3$ is in the range of up to about 10 wt. %, including 9, 8, 7, 6, 5, 4, 3, 2, 1, 0.5, and 0.1 wt. %, on an oxide basis, in each case based on the total weight of the calcined ion-exchanged molecular sieve component and reported on a volatile free basis.

Any optional additional metal can be selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides and a combination thereof.

As mentioned previously, any optional additional metal content of the metal ion-exchange molecular sieve component, calculated as the oxide, is, in one or more embodiments, at least about 0.1 wt. %, reported on a volatile-free basis. In one or more embodiments, the optional additional metal is present in an amount in the range of about 1 to about 10% by weight, based on the total weight of the ion-exchanged molecular sieve.

The molecular sieves of the current invention refer to support materials such as zeolites and other framework materials (e.g. isomorphously substituted materials), which may be in particulate form, and in combination with one or more promoter metals, used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. Zeolites refer to a specific example of a molecular sieve, which include silicon and aluminum atoms and include materials such as aluminosilicates and aluminophosphates. According to one or more embodiments, it will be appreciated that by defining the molecular sieves by their structure type, it is intended to include the structure type and any and all isotypic framework materials such as SAPO, ALPO, and MeAPO materials having the same structure type as the zeolite materials.

In more specific embodiments, reference to an aluminosilicate zeolite structure type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, which include aluminum and phosphate atoms within the zeolite framework.

Aluminosilicates generally comprise open 3-dimensional framework structures composed of corner-sharing $TO_4$ tetrahedra, where T is Al or Si. In one or more embodiments, the small-pore molecular sieve comprises $SiO_4/AlO_4$ tetrahedra and is linked by common oxygen atoms to form a three-dimensional network. The small-pore molecular sieve of one or more embodiments is differentiated mainly according to the geometry of the voids which are formed by the rigid network of the $(SiO_4)/AlO_4$ tetrahedra. The entrances to the voids are formed from 6, 8, 10, or 12 ring atoms with respect to the atoms which form the entrance opening. In one or more embodiments, the molecular sieve comprises ring sizes of no larger than 8, including 6 and 8.

According to one or more embodiments, the molecular sieve can be based on the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve comprises an 8-ring small pore aluminosilicate zeolite. As used herein, "small pore" refers to pore openings which are smaller than about 5 Angstroms, for example on the order of ~3.8 Angstroms. The phrase "8-ring" zeolites refers to zeolites having 8-ring pore openings. Some 8-ring zeolites have double-six ring secondary building units in which a cage like structure is formed resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve is a small-pore, 8-ring molecular sieve having a pore structure and a maximum ring size of eight tetrahedral atoms. In other embodiments, the small-pore molecular sieve comprises a d6r unit. Thus, in one or more embodiments, the small-pore molecular sieve has a structure type selected from AEI, AFT, AFX, CHA, EAB, ERI, KFI, LEV, LTN, MSO, SAS, SAT, SAV, SFW, TSC, and combinations thereof. In other specific embodiments, the molecular sieve has a structure type selected from the group consisting of CHA, AEI, AFX, ERI, KFI, LEV, and combinations thereof. In still further specific embodiments, the small-pore molecular sieve has a structure type selected from CHA, AEI, and AFX. In one or more very specific embodiments, the small-pore molecular sieve component has the CHA structure type.

In one or more embodiments, the molecular sieves include chabazite (CHA) crystal structure zeolites and are selected from an aluminosilicate zeolite, a borosilicate, a gallosilicate, a SAPO, and ALPO, a MeAPSO, and a MeAPO. In some embodiments, the CHA crystal structure is an aluminosilicate zeolite. Natural as well as synthetic zeolites may also be used, but synthetic zeolites are preferred because these zeolites have more uniform silica-alumina ratio (SAR), crystallite size, and crystallite morphology, and have fewer and less concentrated impurities (e.g. alkali and alkaline earth metals). For example, in some embodiments, zeolitic chabazite includes a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538, which is hereby incorporated by reference. Synthesis of a synthetic form of a molecular sieve having the chabazite crystal structure, silicoaluminophosphate 34 (SAPO-34), is described in U.S. Pat. Nos. 4,440,871 and 7,264,789, which are hereby incorporated by reference. A method of making yet another synthetic molecular sieve having chabazite structure, SAPO-44, is described in U.S. Pat. No. 6,162,415, which is hereby incorporated by reference.

Specific zeolites having the CHA structure that are useful in the present invention include, but are not limited to SSZ-13, SSZ-62, natural chabazite, zeolite K-G, Linde D, Linde R, LZ-218, LZ-235, LZ-236, ZK-14, SAPO-34, SAPO-44, SAPO-47, CuSAPO-34, CuSAPO-44, CuSAPO-47, and ZYT-6.

The molecular sieve is typically present in the form of a highly crystalline material, the material being at least about 75% crystalline, at least about 80% crystalline, at least about 85% crystalline, at least about 90% crystalline, at least about 95% crystalline, at least about 98% crystalline, at least about 99% crystalline, or at least about 99.5% crystalline.

The particle size of the zeolite can vary. Generally the particle size of CHA zeolite can be characterized by a D90 particle size of about 10 to about 40 microns, preferably about 10 to about 30 microns, more preferably 10 microns to about 20 microns. D90 is defined as the particle size at which 90% of the particles have a finer particle size.

Molecular sieves typically exhibit a BET surface area in excess of 60 $m^2/g$, often up to about 200 $m^2/g$ or higher. "BET surface area" has its usual meaning of referring to the Brunauer, Emmett, Teller method for determining surface area by $N_2$ adsorption. In one or more embodiments, the surface area surface area is at least about 200 $m^2/g$, or at least about 400 $m^2/g$, or at least about 600 $m^2/g$.

Zeolites are crystalline materials having rather uniform pore sizes which, depending upon the type of zeolite and the type and amount of cations included in the zeolite lattice, range from about 3 to 10 Angstroms in diameter.

The ratio of silica to alumina of an aluminosilicate molecular sieve can vary over a wide range. In one or more embodiments, the molecular sieve has silica to alumina molar ratio (SAR) in the range of 2 to 300, including 5 to 250; 5 to 200; 5 to 100; and 5 to 50. In one or more specific embodiments, the molecular sieve has a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

In one or more specific embodiments, the small-pore molecular sieve has the CHA structure type and has a silica-to-alumina ratio of from 2 to 300, including 5 to 250, 5 to 200, 5 to 100, and 5 to 50; 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50. In a specific embodiment, the small-pore molecular sieve comprises SSZ-13. In a very specific embodiment, the SSZ-13 has a silica-to-alumina ratio of from 2 to 300, including 5 to 250, 5 to 200, 5 to 100, and 5 to 50; 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

Synthesis of zeolites and related micro- and mesoporous materials varies according to the structure type of the zeolitic material, but typically involves the combination of several components (e.g. silica, alumina, phosphorous, alkali, organic template etc.) to form a synthesis gel, which is then hydrothermally crystallized to form a final product. The structure directing agent (SDA) can be in the form of an organic, i.e., tetraethylammonium hydroxide (TEAOH), or inorganic cation, i.e. $Na^+$ or $K^+$. During crystallization, the tetrahedral units organize around the SDA to form the desired framework, and the SDA is often embedded within the pore structure of the zeolite crystals. In one or more embodiments, the crystallization of the molecular sieve materials can be obtained by means of the addition of structure-directing agents/templates, crystal nuclei or elements. In some instances, the crystallization can be performed at temperatures of less than 100° C. A molecular sieve having the CHA structure may be prepared according to various techniques known in the art, for example U.S. Pat. No. 8,293,198 to Beutel et al.; U.S. Pat. No. 8,715,618 of Trukhan et al.; U.S. Pat. No. 9,162,218 of Bull et al.; U.S. Pat. No. 8,883,119 of Bull et al., U.S. Pat. No. 4,544,538 to Zones et al; and U.S. Pat. No. 6,709,644 to Zones et al., which are herein incorporated by reference in their entirety.

Optionally, the obtained alkali metal zeolite is $NH_4$-exchanged to form $NH_4$-Chabazite. The $NH_4$-ion exchange can be carried out according to various techniques known in the art, for example Bleken, F.; Bjorgen, M.; Palumbo, L.; Bordiga, S.; Svelle, S.; Lillerud, K.-P.; and Olsbye, U. Topics in Catalysis 52, (2009), 218-228.

Aluminosilicates generally comprise open 3-dimensional framework structures anionic in nature. Cations balance the charge of the anionic framework and are loosely associated with the framework oxygens, while the remaining pore volume is filled with water molecules. The non-framework cations are generally exchangeable, and the water molecules removable. For example, aluminum atoms present as part of the anionic framework attracts excess negative charge which is compensated for by cations such as metal cations. Typically the metal content or the degree of exchange of a zeolite is determined by the quantity of metal species present in the zeolite. There are usually three different centers in zeolites described as so-called α-, β- and γ-positions, which define the position of the exchange spaces (also called "exchangeable positions or sites"). These sites are often partially occupied by promoter metals and take part in the $NH_3$—SCR reaction. When sulfur species are present such as sulfur dioxide or sulfur trioxide, the promoter metals within these exchangeable sites associate with these sulfur species to generate metal sulfites and metal sulfates. For example, sulfur species can adsorb onto copper ion-exchanged CHA zeolite and form adsorbed copper sulfate ($CuSO_4$) and aluminum sulfate ($Al_2(SO_4)_3$). These adsorbants have a high affinity for the catalyst surface and block the exchangeable sites ("reactive sites"), which promote NOx conversion. Furthermore, SOx species such as $SO_2$ and $SO_3$ exhibit a higher affinity for the promoter metals such as copper compared to NOx and therefore are able to successfully compete with NOx for the reactive sites. The blocking of these reactive sites by copper sulfate results in a general decline in catalytic activity of the catalyst. Removal of the sulfate species from the reactive sites is often accomplished at high temperature in the presence of hydrogen or hydrocarbon, followed by oxidation in air. Often such desulfation conditions are accompanied by a high fuel penalty.

In the current invention, exposure of the sulfur poisoned catalyst described above to an ammonia based reductant at low temperature (e.g. below 350° C.) results in the conversion of the copper sulfate species to an ammonium sulfate species. When the temperature is elevated ammonium sulfate desorbs from the catalyst surface and discharges into the atmosphere to form $NH_3$ and $SO_2$, thereby liberating the metal in the reactive site and restoring NOx conversion activity. In some embodiments, the ammonium sulfate therefore decomposes at substantially lower temperature than copper sulfate, thereby lowering the fuel penalty often associated with the desulfation process.

b. Substrate

According to one or more embodiments, the substrate for the catalyst article composition (i.e., SCR catalyst composition) may be constructed of any material typically used for preparing automotive catalysts and will typically comprise a metal or ceramic honeycomb structure. The substrate typically provides a plurality of wall surfaces upon which the catalyst article (i.e., SCR catalyst) washcoat composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon carbide, silicon nitride, aluminum titanate, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

Figure 2:
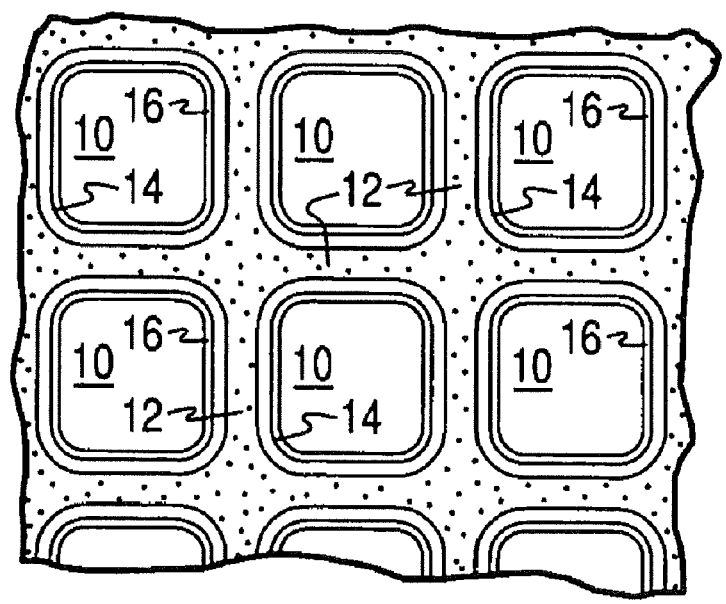
FIG. 2 is a partial cross-sectional view enlarged relative to FIG. 1 and taken along a plane parallel to the end faces of the substrate carrier of FIG. 1, which shows an enlarged view of a plurality of the gas flow passages shown in FIG. 1, in an embodiment wherein the substrate is a monolithic flow-through substrate.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst article (i.e. SCR catalyst) composition can permeate into the pore structure of the porous walls (i.e., partially or fully occluding the pore openings) in addition to being disposed on the surface of the walls. FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 3:
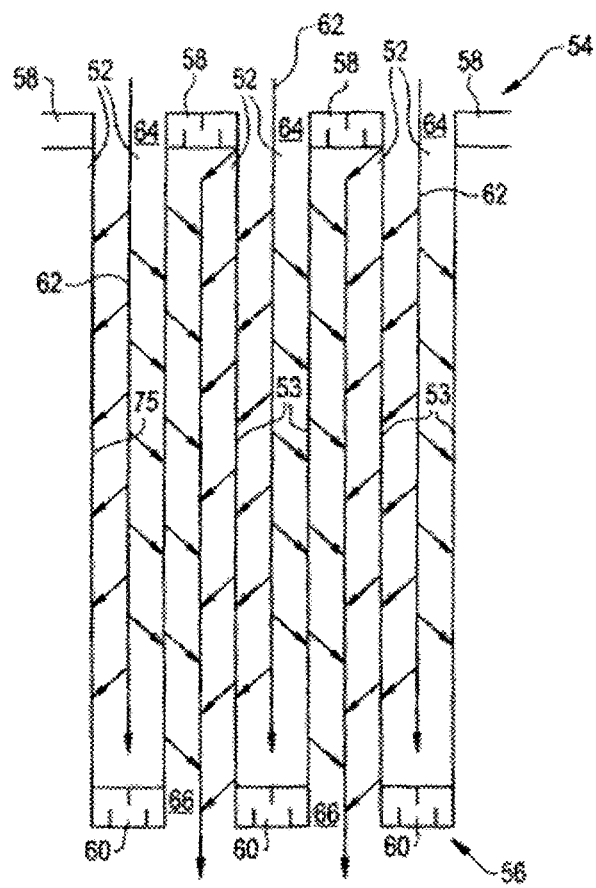
FIG. 3 is a cutaway view of a section enlarged relative to FIG. 1 and taken along a plane perpendicular to the end faces of the substrate in FIG. 1, wherein the honeycomb-type substrate carrier in FIG. 1 represents a wall flow filter substrate monolith.

Alternatively, FIGS. 1 and 3 illustrate an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may be filled with all, or part, of the catalytic material. This invention includes the use of one or more layers of catalytic material that are within the wall or on the inlet and/or outlet walls of the element.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the catalytic article (i.e., both ion-exchanged metals on zeolite support material) on the catalyst substrate, such as a monolithic flow-through substrate, is typically from about 0.1 to about 6 g/in$^3$, and more typically from about 1 to about 5 g/in$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

c. Method of Making

Preparation of the metal ion-exchanged molecular sieve typically comprises an ion-exchanged process of the molecular sieve in particulate form with a metal precursor solution. Multiple metal precursors can be ion-exchanged at the same time or separately, can use the same external solution or separate external solutions, and are ion-exchanged on the same support particles.

For example, in certain embodiments, metal ion-exchanged molecular sieves have previously been prepared using ion-exchange techniques described in U.S. Pat. No. 9,138,732 to Bull et al and U.S. Pat. No. 8,715,618 to Trukhan et al., which are incorporated by reference therein in their entireties. These ion-exchange processes describe the preparation of a copper ion-exchanged CHA zeolite catalyst. These particles can optionally undergo further ion-exchange with at least one additional metal precursor.

The concentration of the metal precursor used to prepare the metal ion-exchanged molecular sieves may range from about 0.1 wt. % to about 10 wt. % relative to the weight of the metal ion-exchanged molecular sieves.

The support particles are usually sufficiently dry to absorb substantially all of the solution to form a moist solid. Following treatment of the support particles with the solution of the metal precursors, the particles are dried, such as by heat treating the particles at elevated temperature (e.g., 100-150° C.) for a period of time (e.g., 1-3 hours), and then calcining to convert the metal components to a more catalytically active oxide form. An exemplary calcination process involves heat treatment in air at a temperature of about 500-800° C. for about 1-3 hours. The above process can be repeated as needed to reach the desired level of metal precursor being ion-exchanged. The resulting material can be stored as a dry powder or in slurry form.

d. Substrate Coating Process

The above-noted catalyst composition, in the form of carrier particles containing a combination of metal components ion-exchanged therein, is mixed with water to form a slurry for purposes of coating a catalyst substrate, such as a honeycomb-type substrate.

As previously mentioned, in addition to the catalyst particles, which contain metal ion-exchanged molecular sieves, the slurry may optionally contain at least one additional metal precursor. The metal precursors used are metal salts known in the art.

In addition to the catalyst particles, the slurry may optionally contain binders such as alumina, silica and/or titania, water-soluble or water-dispersible stabilizers (e.g., barium acetate), promoters (e.g., lanthanum nitrate), associative thickeners, and/or surfactants (including anionic, cationic, non-ionic or amphoteric surfactants).

When present, the binder is typically used in an amount of about 0.05 g/in$^3$ to about 1 g/in$^3$. When alumina is used as the binder it can be, for example, boehmite, gamma-alumina, delta/theta alumina, silica-alumina, zirconia-alumina, or combinations thereof.

The slurry can be milled to enhance mixing of the particles and formation of a homogenous material. The milling can be accomplished in a ball mill, continuous mill, or other similar equipment, and the solids content of the slurry may be, e.g., about 10-60 wt. %, more particularly about 30-40 wt. %. In one embodiment, the post-milling slurry is characterized by a D90 particle size of about 10 to about 40 microns, preferably 10 to about 30 microns, more preferably about 10 to about 15 microns. The D90 is defined as the particle size at which 90% of the particles have a finer particle size.

The slurry is then coated on the catalyst substrate using a washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., about 10 minutes to about 3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat layer may be applied.

The catalyst composition can be applied as a single layer or in multiple layers. In one embodiment, the catalyst is applied in a single layer (e.g., only layer 14 of FIG. 2). In another embodiment, the catalyst composition is applied in multiple layers (e.g., layers 14 and 16 of FIG. 2). Layer 14 and layer 16 may be the same of different in composition.

Desulfation Methods

In general, SOx is always present in the exhaust gas stream in addition to NOx. Although the amount of SOx is much less than NOx (e.g., SOx:NOx=1:1000), SOx will eventually poison the SCR catalyst, due to the increased affinity of SOx for the reactive sites present on the catalyst surface compared to NOx. Once SOx is adsorbed onto the reactive site of the SCR catalyst, it forms a sulfate species and remains strongly associated with the catalyst surface, thereby blocking reactive sites that promote NOx conversion. Desulfation methods to remove sulfur from the catalyst surface and free reactive sites to restore catalytic NOx conversion activity are needed.

The present invention therefore provides desulfation methods that proceed in part at low temperature in the presence of an ammonia based reductant to desorb sulfur from a sulfur poisoned SCR catalyst, to restore its catalytic NOx conversion activity. In some embodiment, a method for desulfating a metal-promoted molecular sieve catalyst having an amount of sulfur thereon, comprises treating the metal-promoted molecular sieve catalyst with a gaseous stream comprising a reductant for a first treatment time period and at a first treatment temperature sufficient to transform the metal sulfate into ammonium sulfate followed by heating the catalyst for a second treatment time period at a second higher treatment temperature sufficient desorb sulfur from the surface of the metal-promoted molecular sieve catalyst. This process for sulfur removal increases NOx conversion activity of the metal-promoted molecular sieve catalyst, wherein the treatment temperature is less than about 350° C. for at least a portion of the first treatment time and wherein the molar ratio of gaseous reductant to NOx during the treating step is at least about 1.05:1.

In some embodiment the reductant comprises ammonia or any precursor thereof such as hydrazine, urea ((NH$_2$)$_2$CO), ammonium carbonate, ammonium carbamate, ammonium hydrogen carbonate or ammonium formate. In general, the reducing agent used for the desulfation processes broadly promotes desorption of the sulfur from the reactive sites on the catalyst by forming an ammonium sulfate species. The ammonium sulfate species can dissociate at temperatures below 600° C. from the surface of the catalyst to free the reactive sites on the catalyst. NOx conversion activity is thereby restored.

The amount of reductant used is in excess compared to the amount of NOx present in the exhaust gas stream. In one or more embodiments, the excess amount of reductant used is an amount that provides a molar ratio of reductant to NOx (also referred to as the normalized stoichiometric ratio or NSR ratio) from about 1.05:1 to about 10:1, preferably greater than about 1.1:1, or greater than about 1.5:1, or greater than about 2:1, or greater than about 2.5:1, or even greater than about 3:1. In certain embodiments, the NSR ratio during desulfation treatment is greater than about 4:1.

In some embodiments, a portion of the first treatment time period ranges from about 1 second to about 20 minutes, preferably about 15 seconds to about 20 minutes, most preferably about 45 seconds to about 20 minutes (e.g., at least 1 second, at least 15 seconds or at least 45 seconds) at a first temperature. In some embodiments, there may be multiple portions of the first treatment time period. In some embodiments, the treatment time is divided into at least two portions of time. In some embodiments, a portion of the first treatment time ranges from about 1% to about 100%, preferably from about 10% to about 100. For example, in some embodiments a portion of the first treatment time is about 1%, 5%, 10%, 15%, 20%, 25%, 30%, 35%, 40%, 45%, 50%, 55%, 60%, 65%, 70%, 75%, 80%, 85%, 90%, 95% or about 99% of the first treatment time.

The treatment time of the desulfation method comprises various portions of time at multiple temperatures. In some embodiments, the first treatment temperature is less than about 350° C. for at least a first portion of the treatment time. Although not bound by any particular theory of operation, at this lower temperature, the metal sulfate species (i.e., copper sulfate), which resides on the catalyst surface blocking the catalytic metal sites responsible for NOx reduction, undergoes an ion exchange process with the ammonia based reductant to generate an ammonium sulfate species. The generated ammonium sulfate species can now be removed from the surface of the catalyst at an increased second temperature for a portion of the treatment time thereby liberating sulfur from the metal to restore the catalytic function of the metal site. In some embodiments, the second temperature is about 425° C., where the ammonium sulfate species is desorbed from the surface of the catalyst. Formation of the ammonium sulfate species at the first temperature below 350° C. prior to increasing the treatment temperature to the higher second temperature of about 400° C. to about 600° C. minimizes the amount of time the catalyst is exposed to elevated temperatures known to decrease SCR catalyst performance. Furthermore, although not bound by any particular theory of operation the ammonium sulfate species is the preferred sulfate species for removing the sulfur from the catalyst because it exhibits a decreased thermal stability compared to copper sulfate and can therefore be removed from the catalytic surface at lower temperature (i.e., <600° C.) compared to copper sulfate (i.e., >600° C.). Further embodiments include methods using a first temperature of no greater than about 250° C., preferably no greater than about 300° C., most preferably no greater than about 350° C., and a second temperature increased to a maximum temperature in the range of about 400° C. to about 600° C. (i.e., no more than 400° C. or no more than 500° C. or no more than 600° C.). In some embodiments, the temperature during the desulfation method is increased over a temperature range over the treatment time period. For example, in some embodiments, the treatment temperature is in the range of about 250° C. to about 425° C.

The amount of the second treatment time sufficient to desorb sulfur from the surface of the catalyst composition ranges from about 1 second to about 60 minutes, preferably 1 second to about 30 minutes, more preferably about 1 minute to 10 minutes (e.g., at least 1 second or at least 1 minute). The second treatment time may be divided into various portions of time for the desulfation treatment occurring at multiple temperatures. In some embodiments, the first portion of the second treatment time period ranges from about 1 second to about 20 minutes, preferably about 15 seconds to about 20 minutes, most preferably about 45 seconds to about 20 minutes (e.g., at least 1 second, at least 15 seconds or at least 45 seconds) at a first temperature. In some embodiments, the second portion of the second treatment time period ranges from about 1 second to about 20 minutes, preferably about 1 minute to about 20 minutes, most preferably about 5 minutes to about 20 minutes (e.g., at least 1 second or at least one minute or at least 5 minutes) at a second temperature. In some embodiments, the treatment time is divided into at least two portions of time. In some embodiments, a portion of the second treatment time ranges from about 1% to about 99%. For example, in some embodiments a portion of the second treatment time is about 1%, 5%, 10%, 15%, 20%, 25%, 30%, 35%, 40%, 45%, 50%, 55%, 60%, 65%, 70%, 75%, 80%, 85%, 90%, 95% or about 99% of the second treatment time.

In some embodiments, the first treatment time period (i.e., the time for addition of reductant at low temperature) is about 5% to about 80% of the treatment time, preferably about 10% to about 50% of the treatment time, most preferably about 10% to about 20% of the total treatment time (i.e., at least 5% or at least 10% of the treatment time).

The amount of sulfur desorbed during the desulfation method can be measured as gaseous sulfur dioxide ($SO_2$) released. As mentioned above adding the ammonia based reductant during the first time at the first temperature promotes desorption of sulfur by forming an ammonium sulfate species on the catalyst surface, which subsequently during the second treatment time at the second treatment temperature dissociates from the catalyst and further desorbs in the gaseous exhaust stream as $SO_2$ and an ammonia species. In some embodiments, the amount of sulfur desorbed from the catalyst can directly be correlated to the amount of $SO_2$ released in the exhaust gas stream downstream of the catalyst. The amount of $SO_2$ released in the exhaust gas stream can be determined by measuring the difference of $SO_2$ present in the exhaust gas stream before and after desulfation. In some embodiments, the amount of $SO_2$ released is at least about 5 ppm or at least about 10 ppm or at least about 20 ppm or at least about 30 ppm.

The amount of $SO_2$ released into the gas stream can directly be correlated to the amount of sulfur removed during desulfation. In one or more embodiments, the amount of sulfur removed during desulfation is at least about 50% or at least about 60% or at least about 70% or at least about 80% or at least about 90% or at least about 95% of the total sulfur content by weight in the catalyst.

Desulfation of sulfur poisoned catalyst compositions using the desulfation method of the current invention restores the NOx conversion activity of such regenerated catalysts. The increase in NOx conversion activity of the regenerated catalyst compared to the sulfur poisoned catalyst can be determined by measuring the difference in NOx conversion activity of the catalyst composition before and after desulfation of the catalyst composition. In some embodiments, the deNOx efficiency of a catalyst composition may be restored to at least 50%, preferably at least 60%, more preferably at least 70%.

In cases where insufficient deNOx efficiency is restored, the two-step desulfation process may be repeated two or multiple times until sufficient activity is restored.

Emission Treatment System

The present invention provides an emission treatment system that incorporates the selective catalytic reduction catalyst (SCR) composition (i.e., catalytic article) described herein and methods for desulfation of such. The SCR catalyst composition of the present invention is typically used in an integrated emissions treatment system comprising one or more additional components for the treatment of exhaust gas emissions, e.g., exhaust gas emissions from a diesel engine, which all communicate with a controller unit. The controller unit receives information from various components of the emission treatment system and can determine when a desulfation treatment is required and activate such. For example, the emission treatment system may further comprise a catalyzed soot filter (CSF) component and/or a selective diesel oxidation (DOC) catalytic article. The SCR catalyst is typically located upstream or downstream from the soot filter and downstream from the diesel oxidation catalyst component, although the relative placement of the various components of the emission treatment system can be varied. The treatment system includes further components, such as reductant injectors for ammonia precursors, and may optionally include any additional particulate filtration components, sensors to detect gaseous components within the exhaust gas stream, NO storage and/or trapping components. The preceding list of components is merely illustrative and should not be taken as limiting the scope of the invention.

The CSF may comprise a substrate coated with a washcoat layer containing one or more catalysts for burning trapped soot and or oxidizing exhaust gas stream emissions. In general, the soot burning catalyst can be any known catalyst for combustion of soot. For example, the CSF can be catalyzed with one or more high surface area refractory oxides (e.g., an alumina or a zirconia oxide) and/or an oxidation catalyst (e.g., a ceria-zirconia) for the combustion of unburned hydrocarbons and to some degree particulate matter. The soot burning catalyst can be an oxidation catalyst comprising one or more precious metal catalysts (e.g., platinum, palladium, and/or rhodium). In some embodiments, the CSF may comprise a substrate coated with a washcoat layer containing one or more catalysts for reducing NOx in the exhaust gas stream emissions.

Figure 4:
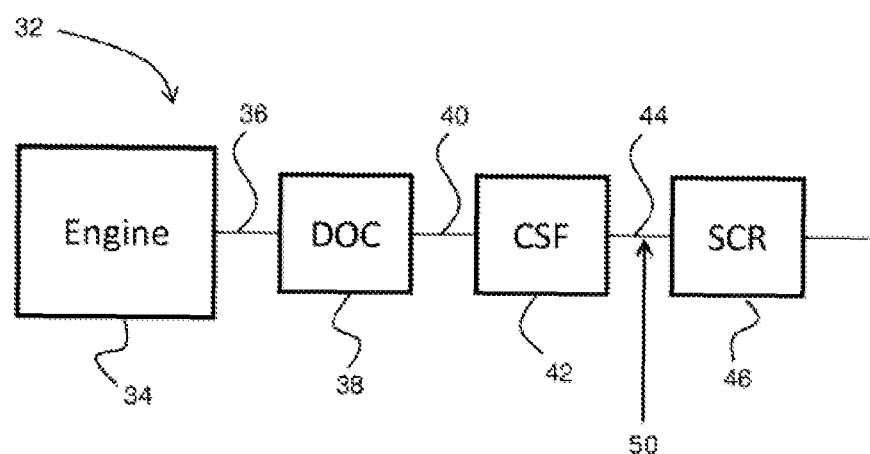
FIG. 4 shows a schematic depiction of an embodiment of an emission treatment system of the present invention, with multiple catalytic units and sensors arranged in the exhaust system.

One exemplary emissions treatment system is illustrated in FIG. 4, which depicts a schematic representation of an emission treatment system 32. As shown, an exhaust gas stream containing gaseous pollutants and particulate matter is conveyed via exhaust pipe 36 from an engine 34 to a diesel oxidation catalyst (DOC) 38 to a catalyzed soot filter (CSF) 42 to a selective catalytic reductive catalyst (SCR also called a selective reduction catalyst (SRC)) 46. In the DOC 38, unburned gaseous and non-volatile hydrocarbons (i.e., the SOF) and carbon monoxide are largely combusted to form carbon dioxide and water. In addition, a proportion of the NO of the NO component may be oxidized to $NO_2$ in the DOC.

The exhaust stream is next conveyed via exhaust pipe 40 to a catalyzed soot filter (CSF) 42, which traps particulate matter present within the exhaust gas stream. The CSF 42 is optionally catalyzed for passive or active soot regeneration.

After removal of particulate matter, via CSF 42, the exhaust gas stream is conveyed via exhaust pipe 44 to a downstream selective catalytic reduction (SCR) component 46 for the further treatment and/or conversion of $NO_x$. The exhaust gas passes through the SCR component 46 at a flow rate which allows sufficient time for the catalyst composition to reduce the level of NOx in the exhaust gas at a given temperature.

An injector 50 for introducing a nitrogenous reducing agent into the exhaust stream is located upstream of the SCR catalyst 46. The introduced nitrogenous reducing agent into the gas exhaust stream promotes the reduction of the NOx to $N_2$ and water as the gas is exposed to the catalyst composition.

Furthermore, this nitrogenous reducing agent may be introduced into the exhaust gas prior to contacting the SCR component 46 for the treatment of NOx. In general, this reducing agent for SCR processes broadly means any compound that promotes the reduction of NOx in an exhaust gas. Examples of such reductants include ammonia, hydrazine or any suitable ammonia precursor such as urea $((NH_2)_2CO)$, ammonium carbonate, ammonium carbamate, ammonium hydrogen carbonate or ammonium formate.

An additional injector 68 can be optionally added to the emission treatment system 32 for introducing a second nitrogenous reducing agent into the exhaust stream located upstream of the SCR component 46 used in the desulfation process of SCR component 46. Injector 68 can be located upstream or downstream of injector 50. Generally, the reducing agent for the desulfation processes also includes ammonia, hydrazine or any suitable ammonia precursor such as urea $((NH_2)_2CO)$, ammonium carbonate, ammonium carbamate, ammonium hydrogen carbonate or ammonium formate. The nitrogenous reducing agent for injector 50 and 68 may be the same or different. If the nitrogenous reducing agent for injector 50 and 68 is the same only one injector may be used for the reduction of NOx and for desulfation of SRC 46, i.e., injector 50 in the emission treatment system 32. With respect to the SCR process, provided herein is a method for the reduction of $NO_x$ in an exhaust gas, which comprises contacting the exhaust gas with the catalyst composition described herein and optionally in the presence of a reductant for a time and temperature sufficient to catalytically reduce $NO_x$ thereby lowering the concentration of $NO_x$ in the exhaust gas. The amount of NOx reduction is dependent upon the contact time of the exhaust gas stream with the catalyst, and thus is dependent upon the space velocity, which is defined as the gas flow rate comprising the entire reaction mixture divided by the geometric volume of the catalyst monolith.

The exhaust gases also contain a small amount of sulfur. The sulfur may be present as a constituent of the fuel or various lubricants in the engine 34. Portions of sulfur may be adsorbed onto the SCR component 46. The adsorbed sulfur occupies catalytic sites of the SCR component 46 responsible for NOx conversion, resulting in a "poisoning" or reduction of the effectiveness of the SCR component 46 towards catalyzing such NOx conversion. The SCR component 46 may be of any type of catalyst known in the art prone to sulfur poisoning, such as a metal-promoted molecular sieve catalyst.

The adsorbed sulfur exhibits a strong affinity towards the SCR component 46, and, according to many prior art desulfation processes, often only high temperatures allow for removal of the sulfur species in significant amounts to regenerate the catalyst. The high temperatures required to regenerate the catalyst in such processes can damage or reduce the operating life of the SCR component 46 or other catalysts or components of the emission treatment system 32. A temporary increase in fuel usage is often a consequence for being able to generate these high temperatures for desulfation, which increases the general cost for operating the vehicle. In some applications the temperatures required for desulfation cannot be obtained without unacceptable fuel penalty.

Sensors can optionally be installed in the emission system to measure the amount of certain gaseous components present in the emission treatment system 32. In some embodiments, a sensor such as 70 can be installed downstream of the SCR component 46 to measure the amount of NOx present in the exhaust gas stream in exhaust pipe 48. Predetermined measurements of NOx can indicate the amount of sulfur accumulation on SCR catalyst 46. If the sensor measures an amount of NOx in the exhaust gas stream, which exceeds such predetermined measurements such result will be communicated from sensor 70 to the controller unit 80. Controller unit 80 can then evaluate the result of the NOx measurement obtained from sensor 70 alone or in combination with additional results obtained from other catalysts or components of the emission treatment system 32 to decide if desulfation of the SCR component 46 is required.

In some embodiments, a sensor such as 72 can be installed upstream or downstream of the SCR component 46 to measure the amount of SOx present in the exhaust gas stream in exhaust pipe 48. Predetermined measurements of SOx can indicate the amount of sulfur accumulation on SCR catalyst 46. If the sensor measures an amount of SOx in the exhaust gas stream, which exceeds such a predetermined measurement such result will be communicated from sensor 72 to the controller unit 80. Controller unit 80 can then evaluate the result of the SOx measurement obtained from sensor 72 alone or in combination with additional results obtained from other catalysts or components of the emission treatment system 32 to decide if desulfation of the SCR component 46 is required.

In some embodiment, NOx levels and/or SOx levels, specifically sulfur dioxide, is measured post desulfation of SCR component 46 to determine the amount of sulfur desorption from SCR component 46 and communicate these results to the controller unit 80. If these results are above a predetermined value of NOx and/or SOx then desulfation was effective. If these results are below a predetermined value of NOx and/or SOx then desulfation has to be repeated. In some embodiments, the emission treatment system 32 comprises at least one sensor. In another embodiment, the controller unit 80 may evaluate results obtained from at least one sensor alone or in combination with additional results obtained from other catalysts or components of the emission treatment system 32 to decide if desulfation of the SCR component 46 was effective and whether desulfation needs to be repeated.

The system 32 further includes a controller unit 80, which is in constant communication with the remaining components of the emission treatment system 32, such as engine 34, DOC 38, CSF 42, SCR 46, injector 50, injector 68, SOx sensor 72, and NOx sensor 70. It shall be appreciated that the controller unit 80 is able to receive data and information from all these components. Furthermore, the controller unit 80 is able to evaluate data received from any one of these components of the emission treatment system 32 individually or in combination to decide whether a desulfation treatment is required. For example, the controller unit 80 is also able to compare data received from any one of these components to a predetermined threshold value.

Figure 5:
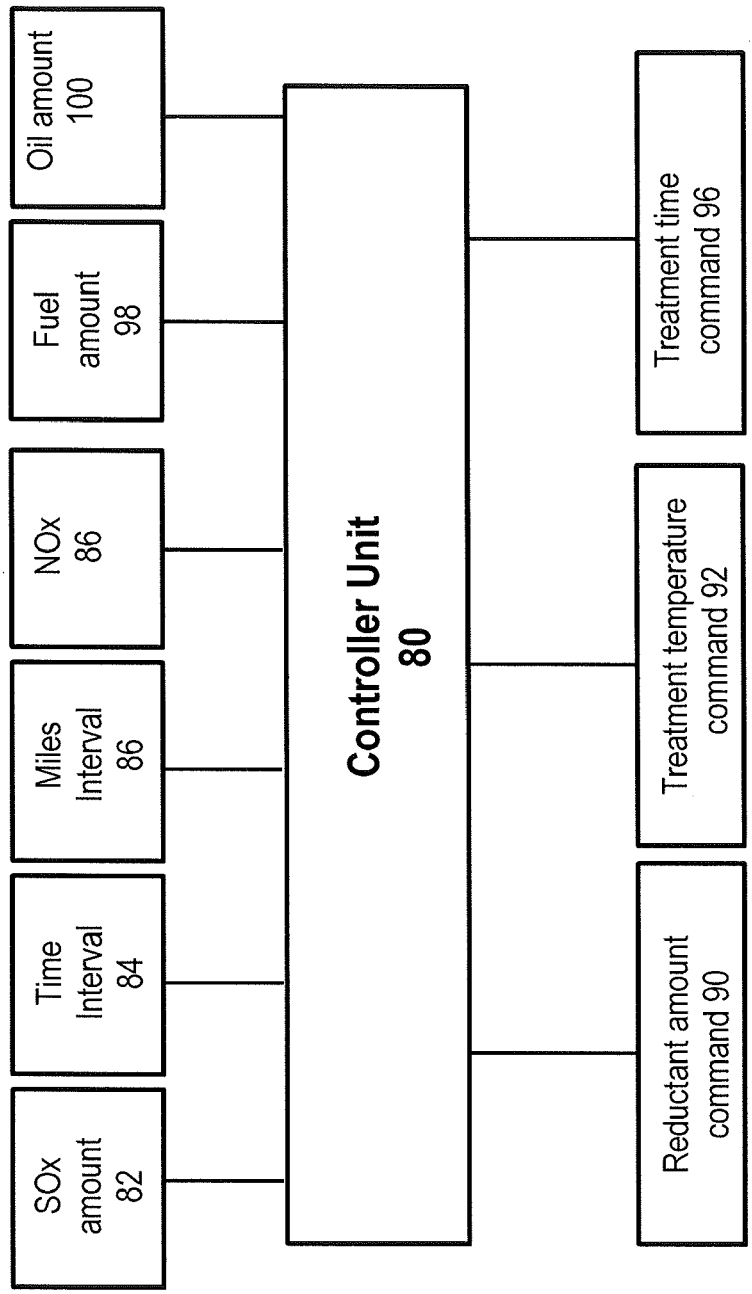
FIG. 5 is a flow diagram showing an exemplary controller apparatus for controlling desulfation to regenerate NOx conversion activity of an SCR catalyst composition.

More specific descriptions of certain embodiments of the operations carried out by the controller unit 80 are included in FIG. 5. Operations illustrated are understood to be exemplary only, and operations may be added or removed, unless stated explicitly to the contrary herein.

As stated previously, certain operations described herein include operations to determine one or more parameters. These values can be obtained by any method known in the art.

In some embodiments, the controller unit 80 is structured to functionally execute operations to detect and/or remove an amount of sulfur from the SCR component 46. In the illustrated embodiment, the controller unit 80 is able to receive and compute information obtained from various components of the emission system 32 such as the amount of SOx detected by the SOx sensor (72), the amount of NOx detected by the NOx sensor (70), the amount of miles traveled (miles interval 86), the amount of running time of the engine (time interval 84), the amount of fuel consumed (fuel consumption 98), and the amount of oil consumed (100). The data and information obtained from these components can be measured, calculated, and modeled against predetermined threshold values.

In certain embodiments, the amount of SOx detected in the exhaust stream may be correlated to the amount of sulfur adsorbed on the SCR component 46 based on predetermined values. Furthermore, the amount of SOx detected in the exhaust gas stream may also be correlated to the catalytic activity of SCR component 46 based on predetermined values. Likewise, in certain embodiments, the amount of NOx detected in the exhaust stream may be correlated to the amount of sulfur adsorbed on the SCR component 46 and/or the catalytic activity of SCR component 46 can be determined based on predetermined values respectively. The amount of SOx and/or NOx level in the exhaust gas may be measured continuously or may only be measured at pre-selected time intervals to evaluate the need for desulfation treatment (i.e., the amount of SOx and/or NOx detected exceeds the predetermined threshold value(s)). In some embodiments, the measurement of SOx and/or NOx level may be done at the same time or may be done at different time points and/or time intervals. Likewise, in some embodiments, the amount of SOx and/or NOx level in the exhaust gas may be measured at pre-selected mileage intervals to evaluate the need for desulfation treatment. In some embodiments, the measurement of SOx and/or NOx level may be done at the same mileage or may be done at a different mileage and/or mileage intervals.

The amount of running time of the engine may include for example the total amount of engine operating time, an operating time above a certain load threshold, pre-selected time points for periodically monitoring SOx and/or NOx level, and period of time passed since the last desulfation treatment.

The amount of miles traveled, may include for example the total amount of miles traveled, pre-selected amount of miles traveled to periodically monitor SOx and/or NOx level, and number of miles passed since last desulfation treatment.

In addition to the amount of running time and miles traveled, determination of need for desulfation may also use the measured or modelled quantity of fuel and measured or modelled quantity of oil consumed to calculate a total sulfur exposure quantity that can be used to trigger a desulfation event.

The amount of fuel consumed, may include for example the total amount of fuel consumed, pre-selected amount of fuel consumed to periodically monitor SOx and/or NOx level, and amount of fuel consumed since last desulfation treatment.

The amount of oil consumed, may include for example the total amount of oil consumed, pre-selected amount of oil consumed to periodically monitor SOx and/or NOx level, and amount of oil consumed since last desulfation treatment.

If a desulfation treatment is required, then the controller unit 80 has access to a reductant amount command 90 for providing a reductant amount to the exhaust conduit, a first treatment time command 96 for providing a first time period for the desulfation treatment and a second treatment temperature command 92 for providing a second temperature or temperature range for the desulfation treatment.

For example, a reductant can be provided to the exhaust conduit at a position upstream of the SCR catalyst 46 which is responsive to the reductant amount command provided herein. The means for providing the reductant includes at least a reductant injector, such as the reductant injector 68 in the emission system 32. The amount of reductant can vary and is dependent upon the amount of sulfur adsorbed onto SCR catalyst 46 in addition to the composition of the catalyst itself and the first temperature or temperature range applied during a given first treatment time frame.

In another example, an increase in the temperature of the exhaust conduit can be provided in response to the treatment temperature command provided herein. Example and non-limiting means for elevating the temperature of the exhaust gas responsive to the second exhaust temperature command are known in the art. For example, the use of a direct heating source such as a burner or electric heater device may be used. The temperature of the exhaust gas may be increased to a single temperature, multiple temperatures, or may be increased over a range of temperatures. For example, in some embodiments, the temperature of the exhaust gas can be increased to a first temperature followed by an increase in temperature to a second temperature, wherein the first and second temperature is individually applied to the exhaust conduit for a specific amount of time (i.e., the treatment time at the first temperature can be the same or different than the treatment time at the second temperature). In another example, the temperature of the exhaust gas can be increased over a temperature range for a specific treatment time period. The temperature(s) and/or temperature range can vary and is dependent upon the amount of sulfur adsorbed onto SCR catalyst 46 in addition to the composition of the catalyst itself and the reductant used during the given first treatment time frame.

In another example, the duration of the treatment time can be provided in response to the treatment time command provided herein. The total amount of treatment time can comprise the treatment time over a range of temperatures or can comprise smaller individual treatment time intervals at multiple temperatures as described above. The duration of the total treatment time of the SCR catalyst 46 is dependent upon the reductant used, the composition of the catalyst, and the treatment temperature(s) or temperature ranges.

As is evident from the figures and text presented above, a variety of embodiments are contemplated and various aspects of the system and methods are disclosed herein.

For example, one aspect involves a method including desulfating an SCR catalyst composition having an amount of sulfur thereon. The SCR catalyst composition may be a metal-promoted molecular sieve catalyst. The desulfation includes providing a fluid stream at a position upstream of the SCR catalyst composition, and the fluid stream includes a reductant amount and a first treatment temperature. The exhaust temperature is then raised to a second treatment temperature which is sufficiently high to desorb sulfur from the surface of the metal-promoted molecular sieve catalyst composition and increase NOx conversion activity of the metal-promoted molecular sieve catalyst. In some embodiments, the treatment temperature is less than about 350° C. for at least a portion of the treatment time. The amount of gaseous reductant during the treating step is present in a molar ratio of gaseous reductant to NOx of at least about 1.05:1. For example, a desulfation method may comprise a first treatment time period during which the metal-promoted molecular sieve catalyst is exposed to a gaseous stream comprising a reductant at a temperature of no greater than about 350° C. followed by a second treatment time period wherein the treatment temperature is increased to a maximum temperature in the range of about 400° C. to about 600° C. In some embodiments, the first treatment time period is about 10% to about 20% of the total treatment time. In other embodiments, the first treatment time period is about 15 to about 45 seconds and the second treatment time period is about 1 to about 3 minutes. In some embodiments, the total treatment time is at least 20 minutes. In other embodiments, the desulfation method may comprise a temperature range of about 200° C. to about 450° C. during the treating step.

Another aspect involves the periodic intervals for the desulfating step, which can be determined by at least one of: (a) preselecting mileage intervals for desulfation; (b) measuring the NOx level downstream from the metal-promoted molecular sieve catalyst and comparing the NOx level to a predetermined threshold value, which if exceeded, triggers the desulfating step; and (c) measuring the SOx level upstream or downstream from the metal-promoted molecular sieve catalyst and comparing the SOx level to a predetermined threshold value, which if exceeded, triggers the desulfating step. The desulfation treatment removes at least 50% by wt. of the sulfur adsorbed onto the metal-promoted molecular sieve catalyst.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

EXAMPLES

Aspects of the present invention are more fully illustrated by the following examples, which are set forth to illustrate certain aspects of the present invention and are not to be construed as limiting thereof.

The following examples are directed towards desulfation methods for copper ion-exchanged CHA zeolite catalyst compositions intended for use in diesel NOx abatement applications—the examples provide desulfation methods to restore NOx conversion.

Samples of the zeolite material were prepared according to standard procedure such as those described in U.S. Pat. No. 9,138,732, which is incorporated by reference in its entirety.

Example 1: Evaluation of Copper Ion-Exchanged CHA Zeolite Catalyst Composition as an SCR Catalyst for Decreasing Diesel NOx Two samples of a copper-promoted CHA zeolite material were exposed to SCR testing conditions to establish a benchmark for SCR performance. Two cordierite honeycomb flow through monoliths with dimensions of 1" diameter×3" length, 400 cpsi, and 4 mil. coated with a copper-promoted CHA zeolite washcoat were degreened by thermal treatment at 650° C. for 4 hours.

Nitrogen oxides selective catalytic reduction (SCR) efficiency of the degreened catalyst monoliths was measured by adding a feed gas mixture of 300 ppm of NO, 300 ppm of $NH_3$, 10% by vol. $O_2$, 5% by vol. $H_2O$, balance $N_2$ to a steady state reactor containing the coated monolith. The gases, $O_2$ (from air), $N_2$ and $H_2O$, were preheated in a preheater furnace before entering the reactor. The inlet temperature was 220° C. The reactive gases NO and $NH_3$ were introduced between the preheater furnace and the reactor. The reaction was conducted at a space velocity of 60,000 $h^{-1}$ across a 200° C. to 600° C. temperature range. Concentration of $NH_3$ and NO present in the exhaust stream from the SCR outlet was measured for 20 minutes. The measured deNOx efficiency was 93.8% and 93.1% for the two samples at 220° C. as steady state.

Example 2: Sulfation of Copper Ion-Exchanged CHA Zeolite Catalyst Composition

Five samples of a DOC catalyst flow through core and five samples of an SCR catalyst flow through core were prepared. The DOC catalyst cores were 1" by 1" cores removed from a cordierite flow through monolith (300 cpsi and 5 mil wall thickness) wash coated with a DOC catalyst composition including only Pt (about 20 g/cft). The SCR catalyst cores were 1" by 3" cores removed from a cordierite flow through monolith (400 cpsi and 4 mil wall thickness) wash coated with a copper-promoted CHA zeolite. SCR cores were degreened by thermal treatment at 650° C. for 4 hours. DOC cores were degreened by thermal treatment at 500° C. for 4 hours. The DOC and SCR cores were paired and tested in series with the DOC upstream to increase the SCR temperature and generate $SO_3$. The DOC-SCR paired cores were exposed to sulfation conditions as follows. Sulfation of sample was measured by adding a feed gas mixture of 15 ppm of $SO_2$, 10% by vol. $O_2$, 5% by vol. $H_2O$, balance $N_2$ to a steady state reactor containing the above paired DOC/SCR cores.

For the sulfation procedure, the SCR component and DOC cores were wrapped with a ceramic insulation mat and placed inside an Inconel reactor tube heated by an electrical furnace. The gases, $O_2$ (from air), $N_2$ and $H_2O$ were preheated in a preheater furnace before entering the reactor. The DOC inlet temperature was 300° C. The reactive gas $SO_2$ was introduced before the DOC. The sulfation process lasted for about 10 hours, to reach 0.6 g/L $SO_2$ loading on SCR catalyst. The reaction was conducted at a space velocity of 60,000 $h^{-1}$. Concentration of $SO_2$ present in the exhaust downstream from the SCR outlet was measured for 20 minutes. This process was repeated for all five pairs of DOC/SCR cores.

Example 3: Evaluation of NOx Conversion Activity of a Sulfur-Poisoned Copper Ion-Exchanged CHA Zeolite Catalyst Composition A single SCR core sample from Example 2 was exposed to conditions for testing SCR performance as set forth in Example 1. The measured deNOx efficiency for the sulfated sample was 22.1%.

Example 4: Desulfation Method to Restore NOx Conversion Efficiency of Sulfur Poisoned Copper Ion-Exchanged CHA Zeolite Catalyst A single SCR core sample from Example 2 was exposed to desulfation conditions as follows. Desulfation conditions involved exposing the core to a feed gas mixture of 300 ppm of NO, 1200 ppm of $NH_3$ (i.e., an NSR of 4), 10% by vol. $O_2$, 5% by vol. $H_2O$, balance $N_2$ in a steady state reactor.

For the desulfation procedure, the SCR core was wrapped with a ceramic insulation mat and placed inside an Inconel reactor tube heated by an electrical furnace. The gases, $O_2$ (from air), $N_2$ and $H_2O$, were preheated in a preheater furnace before entering the reactor. The reactive gases NO and $NH_3$ were introduced between the preheater furnace and the reactor. After 20 minutes of exposure at an inlet temperature of 250° C., the inlet temperature was quickly ramped to 425° C. for 20 minutes. The reaction was conducted at a space velocity of 60,000 $h^{-1}$ Concentration of NO, $NH_3$, $SO_2$ and $SO_3$ present in the exhaust downstream from the SCR outlet was measured.

Example 5: Desulfation Method to Restore NOx Conversion Efficiency of Sulfur Poisoned Copper Ion-Exchanged CHA Zeolite Catalyst A single SCR core sample from Example 2 was exposed to desulfation conditions as set forth in Example 4, except the initial inlet temperature for the first twenty minutes was 300° C. instead of 250° C.

Example 6: Desulfation Method to Restore NOx Conversion Efficiency of Sulfur Poisoned Copper Ion-Exchanged CHA Zeolite Catalyst A single SCR core sample from Example 2 was exposed to desulfation conditions as set forth in Example 4, except the inlet temperature was ramped up to 450° C. as quickly as possible and held for twenty minutes.

Example 7: Evaluation of Desulfated Copper Ion-Exchanged CHA Zeolite Catalyst Composition as an SCR Catalyst for Decreasing Diesel NOx The desulfated test samples from Examples 4-6 were screened for NOx conversion efficiency using the process of Example 1. The measured deNOx efficiency of the SCR core from Example 4 (desulfation initial temperature of 250° C.) was 79.5%. The measured deNOx efficiency of the SCR core from Example 5 (desulfation initial temperature of 300° C.) was 72.7%. The measured deNOx efficiency of the SCR core from Example 6 (desulfation temperature of 450° C.) was 56.6%. This testing indicates that exposure to elevated levels of a downstream reductant such as ammonia can enhance desulfation of a sulfated SCR catalyst. Additionally, lower temperature ammonia overdosing treatment can better improve desulfation performance.

What is claimed:

1. A method for desulfating a SCR catalyst having sulfur thereon, comprising treating the SCR catalyst to desorb sulfur from the surface of the SCR catalyst and increase NOx conversion activity of the SCR catalyst, the treating step comprising treating the SCR catalyst with a gaseous stream comprising a reductant for a first treatment time period and at a first treatment temperature, wherein the first treatment temperature is about 350° C. or less, followed by a second treatment time period and a second treatment temperature higher than the first treatment temperature, wherein the molar ratio of reductant to NOx during the treating step is about 1.05:1 or higher.

2. The method of claim 1, wherein the first treatment temperature is about 300° C. or less.

3. The method of claim 1, wherein the first treatment temperature is about 250° C. or less.

4. The method of claim 1, wherein the second treatment temperature is in the range of about 400° C. to about 600° C.

5. The method of claim 1, wherein the second treatment temperature is in the range of about 400° C. to about 450° C.

6. The method of claim 1, wherein both the first treatment temperature and the second treatment temperature are in the range of about 200° C. to about 600° C.

7. The method of claim 1, wherein both the first treatment temperature and the second treatment temperature are in the range of about 250° C. to about 425° C.

8. The method of claim 1, wherein the first treatment time period is about 10% to about 50% of the total of the first and second treatment time periods.

9. The method of claim 1, wherein the first treatment time period is about 10% to about 20% of the total of the first and second treatment time periods.

10. The method of claim 1, wherein the first treatment time period is about 15 to about 45 seconds and the second treatment time period is about 1 to about 3 minutes.

11. The method of claim 1, wherein the molar ratio of reductant to NOx during the treating step is about 2:1 or higher.

12. The method of claim 1, further comprising injecting a gaseous reductant into an exhaust gas from an engine; exposing the SCR catalyst to the exhaust gas, wherein the exhaust gas comprises one or more sulfur-containing gaseous species; and at periodic intervals, desulfating the SCR catalyst by said treating step.

13. The method of claim 12, wherein the periodic intervals for the desulfating treatment are determined by at least one of: (a) preselecting mileage intervals for desulfation; (b) measuring the NOx level downstream from the SCR catalyst and comparing the NOx level to a predetermined threshold value, which if exceeded, triggers the desulfating step; and (c) measuring the SOx level downstream from the SCR catalyst and comparing the SOx level to a predetermined threshold value, which if exceeded, triggers the desulfating step.

14. The method of claim 1, wherein the SCR catalyst comprises a small pore, 8-ring molecular sieve with a double six ring structure type selected from AEI, AFT, AFX, CHA, EAB, ERI, KFI, LEV, LTN, MSO, SAS, SAT, SAV, SFW, and TSC.

15. The method of claim 14, wherein the SCR catalyst comprises an aluminosilicate zeolite with a CHA crystal structure.

16. The method of claim 1, wherein the SCR catalyst comprises a molecular sieve containing a promoter metal in an amount of from about 0.01% to about 15.0% by weight, based on the total weight of the molecular sieve, calculated as metal oxide.

17. The method of claim 16, wherein the promoter metal is iron or copper.

18. The method of claim 1, wherein the reductant comprises ammonia or an ammonia precursor.

19. The method of claim 1, wherein the sulfur desorbed from the surface of the SCR catalyst is released as gaseous $SO_2$.

20. The method of claim 1, wherein deNOx efficiency of the SCR catalyst following the treating step is at least 70% when exposed to a feed gas mixture of 300 ppm of NO, 300 ppm of $NH_3$, 10% by vol. $O_2$, 5% by vol. $H_2O$, balance $N_2$ at an inlet temperature of 220° C. with a space velocity of 60,000 per hour.

21. The method of claim 1, wherein the treating step removes at least 50% by weight of the sulfur adsorbed on the SCR catalyst.

22. An emission treatment system for treatment of an exhaust gas stream, the emission treatment system comprising:
   a. an engine producing an exhaust gas stream;
   b. an SCR catalyst positioned downstream from the engine in fluid communication with the exhaust gas stream and adapted for the reduction of NOx within the exhaust stream to form a treated exhaust gas stream;
   c. an injector upstream of the SCR catalyst and adapted for the addition of a reductant to the exhaust gas stream to promote reduction of NOx to $N_2$ and water as the exhaust gas stream is exposed to the SCR catalyst; and
   d. a controller operatively connected to the engine and the injector and configured to apply a desulfation treatment process to the SCR catalyst at periodic intervals, the desulfation treatment process comprising treating the SCR catalyst with a gaseous stream comprising a reductant for a first treatment time period and at a first treatment temperature, wherein the first treatment temperature is about 350° C. or less, followed by a second treatment time period and a second treatment temperature higher than the first treatment temperature, wherein the molar ratio of reductant to NOx during the treating step is about 1.05:1 or higher.

23. The emission treatment system of claim 22, wherein the SCR catalyst comprises a molecular sieve containing a promoter metal in an amount of from about 0.01% to about 15.0% by weight, based on the total weight of the molecular sieve, calculated as metal oxide.

24. The emission treatment system of claim 22, further comprising one or both of (1) a NOx sensor located downstream of the SCR catalyst adapted for measuring NOx gases in the exhaust gas stream and wherein the NOx sensor communicates with the controller; and (2) a SOx sensor located downstream of the SCR catalyst adapted for measuring SOx gases in the exhaust gas stream and wherein the SOx sensor communicates with the controller.

25. The emission treatment system of claim 22, wherein the engine is a diesel engine.

26. The emission treatment system of claim 25, further comprising a diesel oxidation catalyst or a catalyzed soot filter upstream of the SCR catalyst.

27. The emission treatment system of claim 22, wherein the reductant comprises ammonia or an ammonia precursor.

* * * * *